May 24, 1938.  F. W. WIEDER  2,118,333
PRODUCTION OF SULPHUR DIOXIDE
Filed Nov. 29, 1935
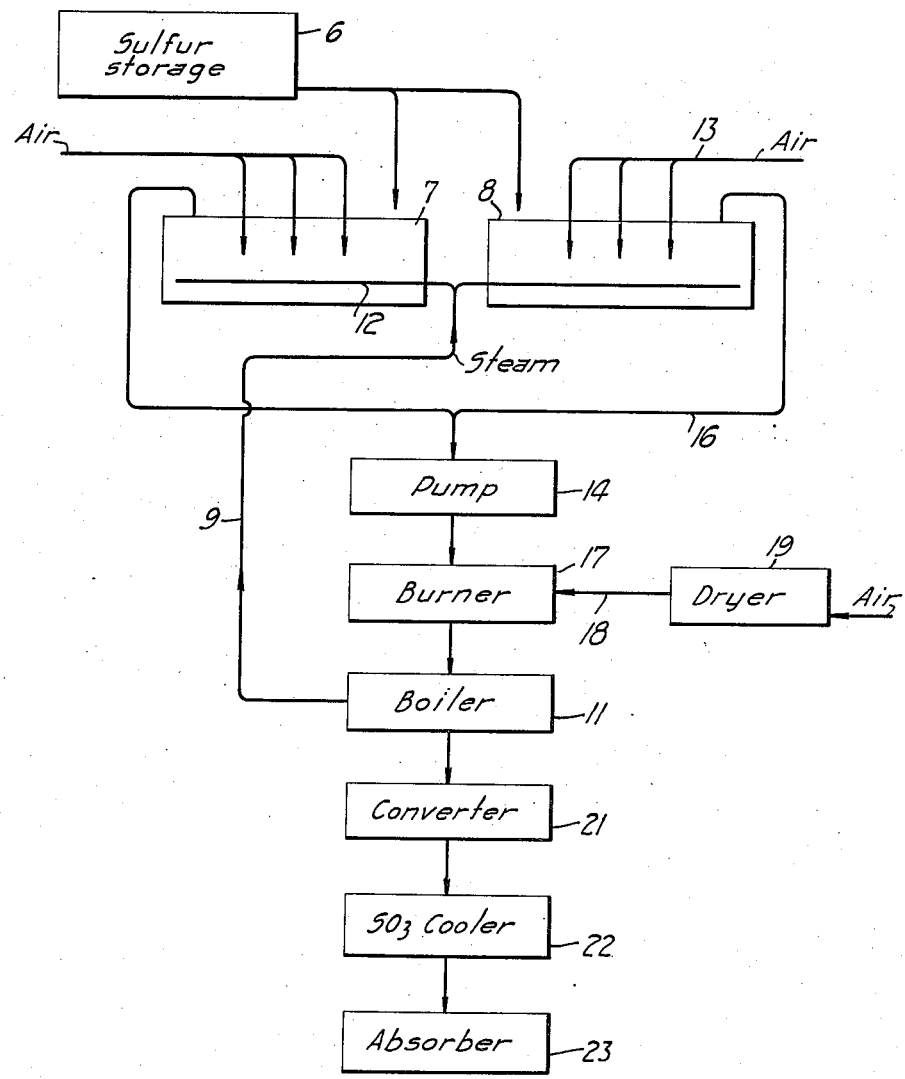
INVENTOR.
Ferd W. Wieder
BY Robert H. Eckhoff
ATTORNEY.

Patented May 24, 1938

2,118,333

UNITED STATES PATENT OFFICE 2,118,333

PRODUCTION OF SULPHUR DIOXIDE

Ferd W. Wieder, Berkeley, Calif., assignor to Stauffer Chemical Company, a corporation of California Application November 29, 1935, Serial No. 52,145

3 Claims. (Cl. 23—179)

This invention relates to the production of anhydrous sulphur dioxide by the burning of sulphur.

Sulphur is burned with air to produce sulphur dioxide which is used as a reagent in various processes. For example, sulphur dioxide is used in the bleaching of sugar, as a starting material for conversion, by the contact process, to sulphur trioxide and then to sulphuric acid, as well as for various other uses. In producing sulphur dioxide, it is the common practice to dry the air passing to the sulphur burner, this step being shown, for example, in the patent to Merriam, Patent 1,384,566 of July 12, 1921. I have discovered that the drying of the air passed to the sulphur burner is not sufficient and that the sulphur must be dried as well since it contains as much as 1% and more moisture even though it has been held for a goodly period of time at a temperature at which it is in a molten state.

I have discovered that the moisture present in sulphur is the cause of many difficulties. For example, in producing sulphur dioxide for bleaching sugar, the presence of moisture is undesirable in that it results in the presence in the sulphur dioxide gas of other compounds which, when contacted with the raw sugar, result in an increase in the invert sugar content. In the production of sulphuric acid, the moisture present results in increased corrosion as well as difficulty in control of the whole process of manufacture. In other processes, I have determined that the presence of moisture gives rise to a hydrogen content in the sulphur dioxide gas which content is undesirable. This will be readily appreciated when it is observed that in many processes sulphur dioxide gas is held at a temperature above the disassociation temperature of water.

Although it has apparently been the common belief heretofore that by merely holding sulphur at a temperature at which the sulphur was in a molten state water would be eliminated, I have determined, after a series of investigations that this is not the case and that water is only difficultly removed from the sulphur. This retention of the water is consistent with my observation that while sulphur is difficultly wet, once the sulphur has been wetted the water is only removed with difficulty. Molten sulphur will retain between 0.1% and 0.5% of water.

It is in general the object of the present invention to improve upon the manufacture of sulphur dioxide and to provide for the production of sulphur dioxide in substantially anhydrous form upon the burning of sulphur.

The invention includes other objects and features of advantage, some of which, together with the foregoing, will appear hereinafter wherein a preferred manner of practicing this invention has been disclosed.

In the drawing accompanying and forming a part hereof the single figure is a diagrammatic representation of the process employed.

I have discovered that the drying of the air employed for burning of sulphur is not sufficient and that sulphur as well must be dried. This I have found can be accomplished readily by agitating the molten sulphur with an anhydrous gas such as hot, dry air. For example, referring to the drawing, sulphur, derived from storage bins 6, is fed either into a melting tank 7 or a melting tank 8. These tanks are alternately used so that a constant supply of sulphur is available. Each tank is supplied with steam through line 9 from boiler 11, a heating coil 12 being provided in each tank. Sulphur in the tank is melted and a dehydrating gas such as air is blown in through lines 13. Ordinary atmospheric air can ordinarily be used and heated since this results in a decrease in moisture content per cubic foot of the air although other dehydrating gases can be used. Heating of the gas simplifies the melting of the sulphur inasmuch as the hot gas does not abstract heat from the sulphur. Sulphur is removed by pump 14 through line 16 from either of the tanks, one tank being heated and blown while the other tank is being used as a source of sulphur for supply to sulphur burner 17. Air or oxygen to support combustion of the sulphur is supplied through line 18 from drier 19. The details of the sulphur burner 17 and the drier 19 are well known in the art and need not be given herein. To effect heat economy, the sulphur is usually burned under a boiler 11 although any other form of heat exchange equipment can be used. The gas passing out from beneath the boiler is substantially bone dry sulphur dioxide. Depending upon the degree of heat exchange effected with the boiler 11, its temperature may vary so that the gas is at a temperature suitable for application to any desired process. If the gas is desired at an extremely high temperature the boiler or heat exchange unit 11 can be omitted although in the contact sulphuric acid process, herein chosen for disclosure, it is usual to cool the sulphur dioxide gas from the sulphur burner by utilization of a boiler.

In the flow sheet disclosed in the drawing, the sulphur dioxide gas is shown as passing to a converter 21 of a type well known in the sulphuric acid art and involving the use of a platinum or vanadium catalyst to effect conversion of the sulphur dioxide to sulphur trioxide. The sulphur trioxide is then passed to a cooler 22 and finally to an absorber 23 wherein the sulphur trioxide is absorbed in a manner well known in the art.

The utilization of the conversion unit and transformation of the sulphur dioxide into sulphuric acid is merely disclosed as typical of one manner of utilizing the bone dry and substantially hydrogen free sulphur dioxide.

Instead of passing the bone dry hydrogen free sulphur dioxide to a conversion unit the sulphur dioxide gas can be passed to an apparatus such as that used for the bleaching of sugar or to any other process wherein the sulphur dioxide in a bone dry and substantially hydrogen free form is desirable.

I claim:

1. That improvement in the art of manufacture of sulphuric acid by the contact process which consists in burning with substantially dry air sulphur which has been first freed of its moisture to produce the required $SO_2$.

2. That improvement in the art of manufacture of sulphuric acid by the contact process which consists in burning with substantially dry air sulphur, which has been first freed of its moisture by blowing a dry gas through the sulphur while it is molten, to produce the required $SO_2$.

3. That improvement in the art of producing substantially anhydrous $SO_2$ which consists in first drying the sulphur by blowing it with a dry gas while the sulphur is molten and then burning the dry sulphur with substantially dry air to produce $SO_2$ substantially free of water vapor and hydrogen.

FERD W. WIEDER.